United States Patent [19]

Luger et al.

[11] Patent Number: 5,661,347
[45] Date of Patent: Aug. 26, 1997

[54] CIRCUITRY ARRANGEMENT FOR CONTROLLING A PLURALITY OF CONSUMERS, IN PARTICULAR LAMP BALLASTS

[75] Inventors: Siegfried Luger; Walter Werner, both of Dornbirn, Austria

[73] Assignee: Tridonic Bauelemente GmbH, Dornbirn, Austria

[21] Appl. No.: 436,346

[22] PCT Filed: Nov. 11, 1993

[86] PCT No.: PCT/EP93/03166

§ 371 Date: Jul. 13, 1995

§ 102(e) Date: Jul. 13, 1995

[87] PCT Pub. No.: WO94/13078

PCT Pub. Date: Jun. 9, 1994

[30] Foreign Application Priority Data

Nov. 24, 1992 [DE] Germany ............... 42 39 448.1
Sep. 6, 1993 [DE] Germany ............... 43 30 114.2

[51] Int. Cl.⁶ .................................................. H02J 1/00
[52] U.S. Cl. .................... 307/39; 307/11; 307/38; 315/178; 315/180; 315/182; 315/183
[58] Field of Search .................... 307/11, 38, 39; 315/178, 180, 182, 183, 209 R

[56] References Cited

U.S. PATENT DOCUMENTS 5,059,871 10/1991 Pearlman et al. ............ 315/316
5,192,897 3/1993 Vossough et al. ............ 315/308
5,471,119 11/1995 Ranganath et al. ............ 315/307

FOREIGN PATENT DOCUMENTS

0490329A1 6/1992 European Pat. Off. .
2072467 9/1981 United Kingdom .
2082876 3/1982 United Kingdom .

*Primary Examiner*—William M. Shoop, Jr.
*Assistant Examiner*—Kim Lockett
*Attorney, Agent, or Firm*—Fitzpatrick, Cella, Harper & Scinto

[57] ABSTRACT

In accordance with the invention the circuitry arrangement comprises a central unit (5) and a plurality of peripheral units, such as control apparatuses for lamps, connected with the central unit via a data bus. These peripheral units are each connected with the data bus (1) via a coupling unit (3), each coupling unit (3) having a receiving branch for the transfer of information from the central unit (5) to the peripheral unit, and a transmission branch for the transfer of information from the peripheral unit to the central unit (5). Here, the central unit (5) sends out information in the form of a modulated a.c or pulse voltage onto the data bus. The transmission branch applies information to the data bus (1) in that the output resistance of the transmission branch is varied. Because the receiving branch in the coupling unit (3) is continuously active and the transmission branch is inactive in the case of non-sending operation, at most a very small return current is consumed in the coupling unit (3). Finally, both for the receiving branch and for the transmission branch, there is provided an overvoltage protection circuit.

15 Claims, 4 Drawing Sheets

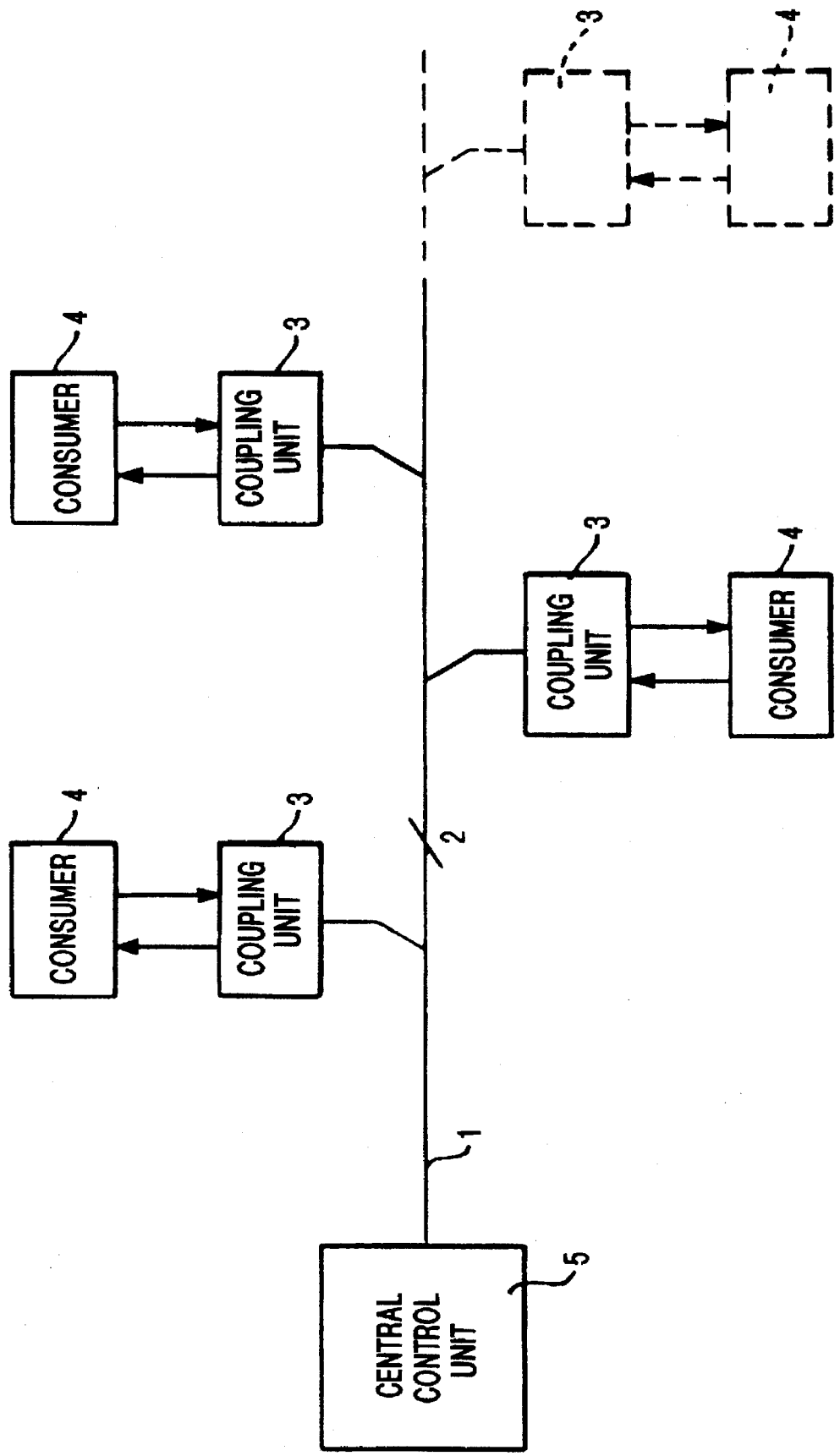

CIRCUITRY ARRANGEMENT FOR CONTROLLING A PLURALITY OF CONSUMERS, IN PARTICULAR LAMP BALLASTS

BACKGROUND OF THE INVENTION

1. Field of the Invention

The invention relates to a circuitry arrangement for controlling a plurality of consumers, such as lamps for example. In particular with the employment of gas discharge lamps, each of these lamps requires its own ballast in order to deliver the respectively necessary ignition or operating voltage to the gas discharge lamp. With the employment of many such lamps there is the possibility of centrally controlling the respective ballasts from a central unit via a data line or bus.

2. Description of the Related Art

From GB-A-2 072 467, there is known a circuitry arrangement in which a central unit is connected with a plurality of peripheral units via a data bus, the functions of the peripheral units being controlled via the data bus. Each peripheral unit has a coupling unit which is divided into a receiving branch and a transmission branch. The receiving branch serves for the transfer of information from the central unit to the peripheral unit, the central unit applying information to the data bus in the form of a modulated a.c. or pulse voltage. The transmission branch serves for the transfer of information from the peripheral unit to the central unit. Here, information is applied from the peripheral unit to the data bus by means of the variation of the output resistance of the transmission branch.

Further, from EP-A-0 490 329, there is known a circuitry arrangement for controlling the brightness and the operational behaviour of gas discharge lamps. Here, a central unit controls a plurality of ballasts for gas discharge lamps via a bus. Each ballast is connected with the bus via a coupling unit. Data is transferred from the bus to the respective ballast concerned via a capacitance circuit or by means of a transformer. If return signals are to be passed from the ballast to the central unit it is possible, when no data is present on the bus, to couple these signals from the ballast into the bus via the same coupling unit.

Both known circuitry arrangements offer the possibility of bringing a peripheral unit into a quiescent state, in which it has only a reduced current, by means of corresponding control signals, but the receiving branch of the coupling unit remains fully activated even in the quiescent state, so that the bus can be subject to load even when no signals are present. In particular when a large number of peripheral units are employed, this leads to a significant current consumption in the central unit.

Further, in both circuitry arrangements, it is disadvantageous that the coupling unit can easily be damaged by an overvoltage on the bus. This can happen, for example, if the circuitry arrangement is laid in the context of normal building installations, for example lighting arrangements. An unintended connection of the bus with a mains voltage line—220 volts or 380 volts—would immediately damage the coupling unit of the circuitry arrangement, whereby the entire arrangement would be made inoperable.

SUMMARY OF THE INVENTION

Thus, the object of the invention is to further develop a circuitry arrangement for controlling a plurality of consumers, of the kind indicated in the introduction, such that secure operation is always ensured with minimal current consumption.

In accordance therewith, coupling unit which has a receiving branch for transferring control information from the central unit, when in sending operation, to the consumer associated with the coupling unit, and a transmission branch for transferring return information from the consumer to the central unit when the central unit is in non-sending operation. The coupling unit has further a switching device which places the receiving branch in an inactive state when the central control unit is in non-sending operation.

According to more specific features of the invention, advantageous configurations of overvoltage protection in the transmission branch and in the receiving branch which are easy to set up, for example a supplementary protection device against overvoltages may be arranged at the output of the transmission branch in case the switch present in accordance with claim 3 does not separate the transmission branch from the bus sufficiently rapidly.

In accordance with further features of the invention, consumer and the central unit are connected to a common bus, whereby the outlay in terms of circuitry for connecting the consumers to the central unit is minimized. Since the consumers are electrically separated from the bus by means of the respective coupling units, an undesired appearance of compensatory currents is avoided, the employment of an opto-coupler making possible the transfer of square wave signals without the need to employ transformers for this purpose, the cost of the provision of which would be significantly greater.

In accordance with a further advantageous configuration of the invention there is provided an arrangement such that when the central unit applies no data signals to the bus it applies a signal the voltage level of which is different from the voltage level of the data signals. By this means it is signalled to the coupling device that the central unit is not in sending operation but is in non-sending operation, whereby it is possible in a simple manner by means of a switching device, for example with a Zener diode, to switch the receiving branch in the coupling unit to an inactive state.

Also an advantageous further development is provided in that the current consumption in the coupling device is monitored for example by means of a constant current source having an MOS field effect transistor, so that in the event of an erroneous connection or in the case of an defective component, further activation of the circuitry arrangement is avoided.

Finally, an advantageous further development of the invention is provided in that the coupling unit has polarity reversal protection means, formed for example with a rectifier bridge circuit. In this way, the connection of the coupling unit to the bus is simplified and at the same time protection is provided against damage to the coupling unit or the consumer due to erroneous connection. The rectifier bridge circuit affords the advantage, in particular the combination with the opto-coupler, that the coupling unit can transfer square wave signals largely without distortion.

BRIEF DESCRIPTION OF THE DRAWINGS

Below, the invention will be described in more detail with reference to the drawings. In the drawings:

FIG. 1 is a block circuit diagram of a circuitry arrangement which embodies the invention;

DETAILED DESCRIPTION OF THE PREFERRED EMBODIMENTS

FIG. 1 shows a block circuit diagram in which a central unit or central control unit 5 is connected with a data bus or a data line 1. Further, a plurality of coupling units 3 are connected to the data line 1, which coupling units couple the data line to the consumers 4 or their respective control units. The signals from the central unit 5 issued onto the data line are thus present at the same time at the inputs of all consumers 4. It is thus necessary, when individual consumers are to be controlled, to code the data signals consumer-specifically. For passing data from the data line 1 to the consumer, the coupling unit has a receiving branch for a connection directed towards the consumer. Analogously, for transferring data from the consumer to the data line, there is a connection directed from the consumer towards the coupling unit, which connection forms a transmission branch.

Figure 2A:
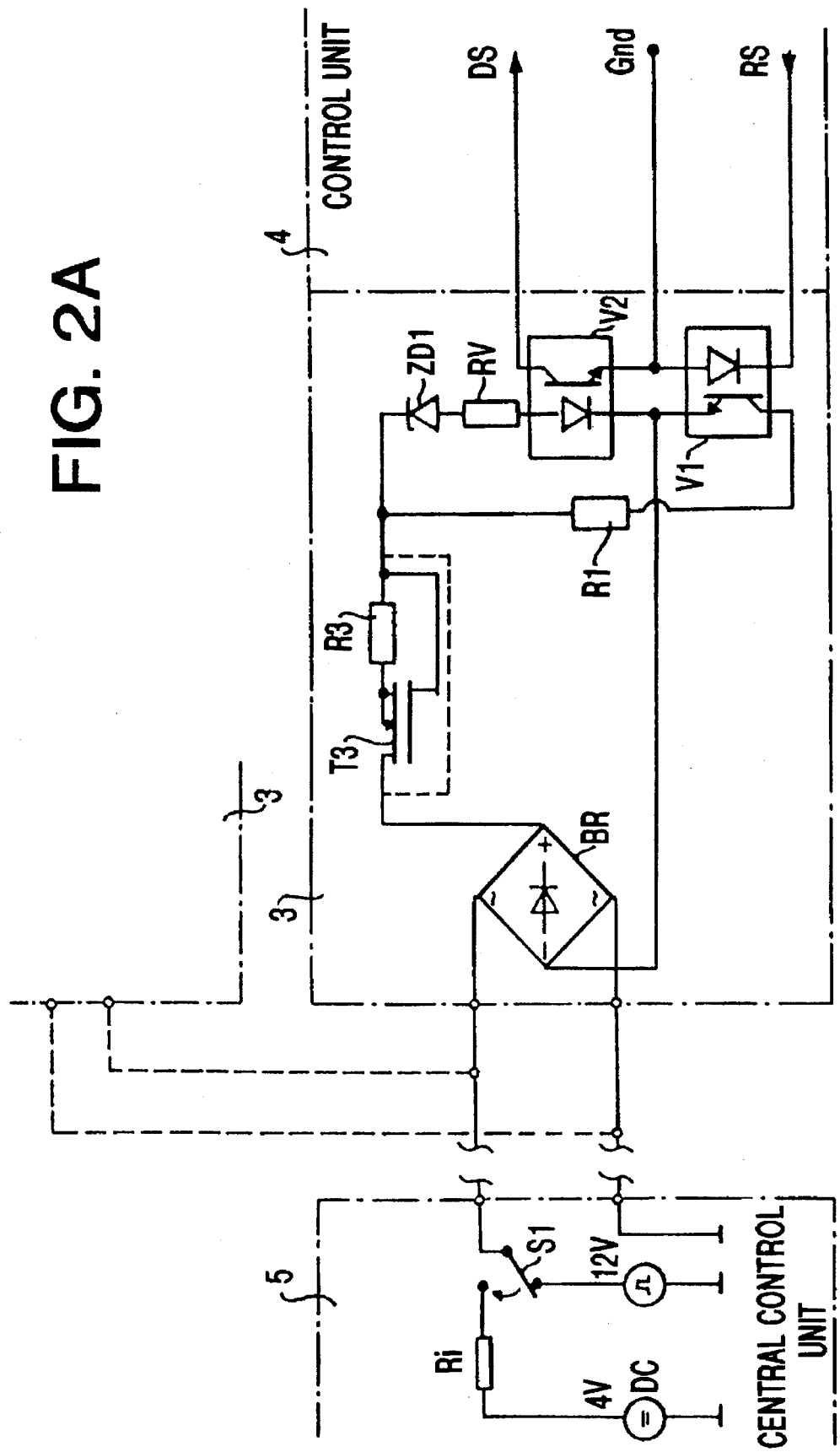
FIGS. 2(a) and 2(b) are more detailed circuit diagrams of first and second exemplary embodiments of the circuitry arrangement of FIG. 1.

FIG. 2(a) shows a circuit diagram of a first exemplary embodiment of the circuitry arrangement, connection points between two components being designated as nodes with the reference signs of the components. The central control unit 5 is connected to the data line which is formed as a two-wire line, the central control unit 5 having a signal generator which produces square wave data signals which in this case have a peak level of 12 V. Further, a d.c. voltage generator DC having an internal resistance Ri is provided, which generator provides a d.c. voltage of 4 V. Both generators produce their signals relative to a common ground potential to which one of the two terminals of the data line 1 is also connected. A selector switch S1 has its moveable working contact connected to the second terminal of the data line 1 and has its fixed selection contacts connected to the respective outputs to the two generators.

At the other end of the data line 1 there is coupled a control unit of a consumer 4, such as for example an electronic ballast EVG for a gas discharge lamp, by means of its coupling unit 3. At the interface between the data line 1 and the electronic ballast there is on the ballast side, i.e. in the coupling unit 3, first a rectifier bridge circuit BR. The a.c. voltage terminals of the bridge circuit are connected to the interface whilst the terminals ± are connected with the subsequent components of the coupling unit 3. A self-conductive MOS field effect transistor T3 is connected by its drain terminal to the plus terminal of the bridge circuit BR. Between the gate terminal and the source terminal, a resistance RK is connected in parallel. At the same time, there is connected between the resistance R3 and the minus terminal of the rectifier BR a series circuit of a PTC resistor RK, a Zener diode ZD1, a resistance RV and an opto-coupler V2, the anode terminal of the Zener diode ZD1 being connected with the anode terminal of the transmission diode of the opto-coupler V2 by way of the resistance RV. For simplification, the minus terminal of the bridge rectifier BR will be referred to below as the minus conductor.

Figure 2B:
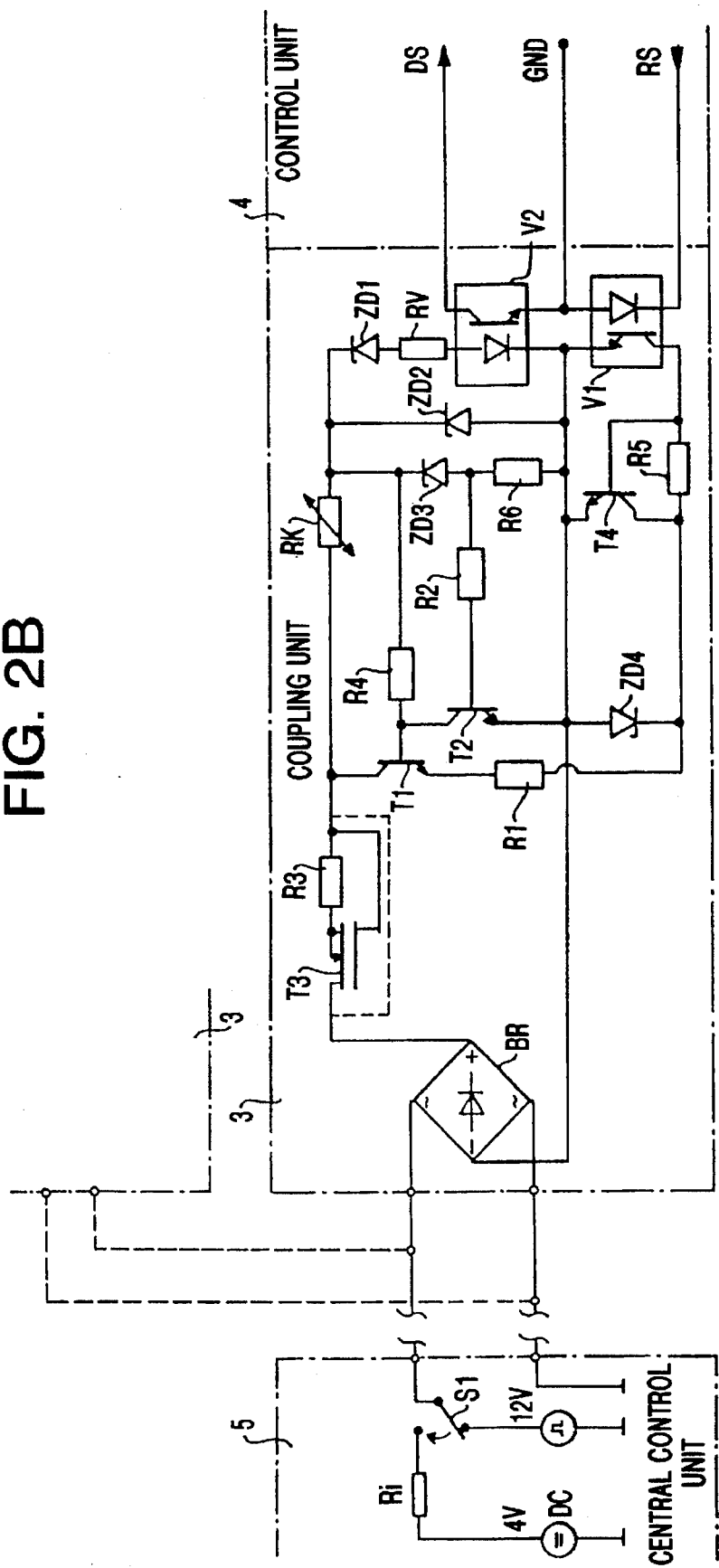

The second exemplary embodiment, as shown in FIG. 2(b), is similar to the above-described first exemplary embodiment but additionally includes the circuitry elements described below. Between the node R3/RK and the minus conductor there is connected a series circuit of, in sequence, a transistor T1, resistors R1 and R5 and the output of an opto-coupler V1. Here, the collector of the transistor T1 is connected to the plus terminal of the bridge rectifier BR and its emitter terminal is connected to the resistance R1. At the base terminal of the transistor T1 is the collector of a transistor T2 the emitter of which is connected with the minus conductor. At the same time, there is connected to the collector of the transistor T2 a terminal of a resistance R4 whilst the other terminal is connected to the node RK/ZD1. A Zener diode ZD3 is connected by its cathode to the same node, whilst a resistance R6 is connected in series with its anode to the minus terminal of the bridge rectifier. A resistance R2 is connected between the base terminal of the transistor T2 and the node ZD3/R6. Further, a parallel circuit of a Zener diode ZD4 and a transistor T4 is connected between the node R1/R5 and the minus conductor, the Zener diode being connected by its cathode contact and the transistor T4 by its Collector to this node. The emitter of the transistor T4 is connected to the minus conductor and the base terminal is connected to the node R5/V1. Finally, a Zener diode ZD2 is connected by its anode to the minus conductor and by its cathode to the node RK/ZD1. In both the first and second exemplary embodiments on the receiving side of the opto-coupler V2, the terminals of the receiving transistor are connected with the data input lines DS and Gnd of a control unit 4 of the electronic ballast, whilst on the transmission side of the opto-coupler V1 the terminals of the transmission diode are connected with terminals of fault return lines RS and Gnd of the control unit 4 of the electronic ballast. Corresponding to the exemplary embodiments represented in FIGS. 2(a) and (b), the respective ground conductors Gnd of the data line and of the fault return lines can be combined and provided as a common ground line Gnd.

Below, the manner of functioning of the a circuitry arrangement described above with reference to FIG. 2(a) will be explained. If the central unit 5 is in sending operation, data signals are produced by the square wave signal generator corresponding to the desired data to be sent. These data signals have a signal level of 12 V and are supplied to the data line 1 via the selection switch S1. Since the bridge circuit BR is located at the input of the coupling unit 3, the polarity of the signal generator, or the arrangement of connections of the data line 1 with the central control unit or with electronic ballast, is of no significance. Thus, the signals captured by the coupling unit 3 are always sent to the transmission diode of the opto-coupler V2 with the correct polarity. Here, through conversion of the electrical signals into light signals and through a return conversion of the light signals into electrical signals on the receiving side, there is achieved an electrical separation between the control unit 4 of the electronic ballast and the data line 1. The data signals passed on in this manner are supplied to the processing device of the control unit 4 and processed there in conventional manner.

If no data signals are being sent out from the central control unit 5 onto the data line 1, the selection switch S1 switches over to the d.c. voltage generator DC; thus, this is non-sending operation. Now, a d.c. voltage of for example 4 V is present on the data line 1, whereby the reception readiness of the central control unit 5 is signalled to the electronic ballast, the polarity of the d.c. generator DC being of no significance because of the bridge rectifier BR at the input of the control unit. Because the Zener diode ZD1 has a Zener voltage the value of which is less than the signal level of the data signal generator and greater than the level of the d.c. voltage generator DC, for example 4.7 V, the opto-coupler V2 is switched off by means of the Zener diode ZD1 in non-sending operation of the central unit 5. When the central unit is in receiving operation the transmission diode of the opto-coupler V2 thus consumes no electrical energy which has to be supplied via the data line 1.

As soon as a signal of the control unit 4 of the electronic ballast EVG is to be passed to the central unit via the return signal line RS, such as a fault return report, there is effected an emission of the signals via the transmission diode of the opto-coupler V1. Analogously to data transfer, these signals are likewise first transformed into optical signals in the opto-coupler V1 and thereafter recovered as electrical signals, whereby also this connection between the control unit 4 and the data line 1 is electrically separated. With the reception of the optical signal emitted from the transmission diode of the opto-coupler V1, the conductivity of the receiving transistor is modulated. Because in this case the receiving transistor of the opto-coupler V1 becomes at least partially conductive there occurs a loading of the d.c. voltage generator DC in the central unit 5. This loading is detected in the central control unit 5 at the resistance Ri and evaluated.

The maximum current consumption of the coupling unit 3 is limited by the self-conducting MOS field effect transistor T3. This transistor is normally-conducting even without a signal between the gate terminal and the source terminal. As a result of a current which flows over the drain-source path and thus also over the resistance R3 a voltage drop occurs at a resistance R3 which at the same time gives rise to a voltage signal between the gate terminal and the source terminal. In correspondence with this signal a reduction of the conductivity of the transistor T3 occurs, whereby a restriction of the current take-up of the coupling unit 3 is achieved. This current restriction serves primarily as a safety device intended to prevent damage to the components in the coupling unit if a wrongly dimensioned signal source is connected to the interface of the coupling unit 3. The current flow through the opto-coupler V2 is limited by the resistance RV. Since the MOS field effect transistor T3 already provides a current limiting device, this resistance RV may be omitted as such. However, since the MOS field effect transistor T3 serves both for the current limiting of the receiving transistor of the opto-coupler V1 and of the transmission diode of the opto-coupler V2, the employment of the resistance RV is to be recommended because, on the one hand, of component differences and, on the other hand, because of the strong temperature dependence of the MOS field effect transistor T3. The same applies analogously for the resistance R1.

Figure 3A:
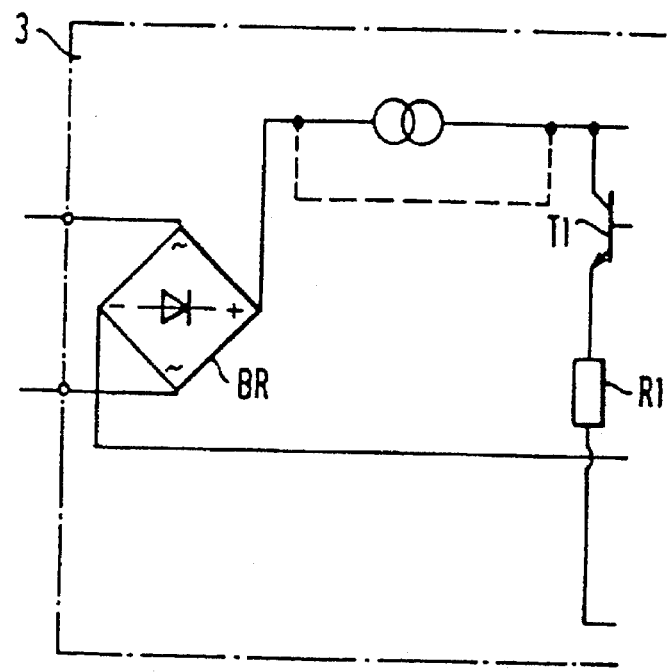
FIGS. 3(a) and 3(b) are partial circuit diagrams showing possible variations of the exemplary embodiment according to FIGS. 2(a) and 2(b).
Figure 3B:
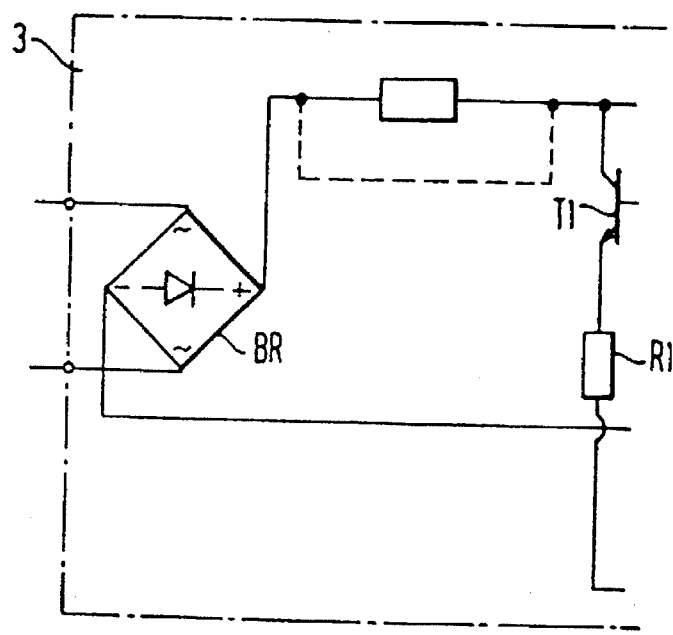

The constant current source having the MOS field effect transistor T3 can, as illustrated in FIG. 3, be replaced by other circuit arrangements which provide constant current sources or current limiting devices. Here, it is preferable to select circuit arrangements which are temperature stable. If it is possible to completely do without the protective effect of this current limiting device, the constant current source may—as indicated in FIGS. 2 and 3 by means of broken lines—be omitted, it being conceivable also to simply replace the constant current source by a resistance.

Below, the additional circuit elements of the second exemplary embodiment according to FIG. 2(b) will be explained.

When the 4 V d.c. voltage provided from the d.c. voltage generator DC is applied to the data line 1, the voltage is determined to be a permitted voltage by the Zener diode ZD3 if the Zener voltage of this Zener diode is between 15 V and 20 V. Now, the transistor T1 is controlled via the resistance R4 whereby there is applied between collector and emitter of the initially blocking transistor T4, via the resistor R1, the voltage on the data line 1 passed on by the rectifier BR. Because the collector/base path of the receiving transistor of the opto-coupler V1 is in blocking polarity only the blocking current of the receiving transistor is carried on this circuit path, whereby—for so long as no data is to be issued from electronic ballast into the data line—the opto-coupler V1 also uses no current worthy of mention that has to be supplied via the data line. As soon as a signal is to be passed from the control unit of the electronic ballast via the return signal line RS, such as a fault return report for example, to the central control unit, emission of these signals via the transmission diode of the opto-coupler V1 takes place. These signals are, analogously to the data transfer in the opto-coupler V1, likewise first transformed into optical signals and thereafter recovered as electrical signals, whereby also the connection between the control unit 4 and the electronic ballast and the data line 1 is electrically separated. With the reception of the optical signal emitted by the transmission diode of the opto-coupler V1 the conductivity of the receiving transistor is modulated and this switches the transistor T4 to be conductive, through the voltage drop at the resistance R5, whereby a loading of the d.c. voltage generator DC in the central control unit 5 occurs. This loading is detected in the central unit 5 at the resistance Ri and evaluated.

As soon as an impermissibly high voltage is applied to the input of the coupling unit 3, this is short-circuited by the Zener diode ZD2 which has a Zener voltage of for example 20 volts. In this way, the impermissibly high voltage in the receiving branch of the coupling unit 3 is diverted before the opto-coupler V2. Thus, in the indicated exemplary embodiment, voltages which are above 20 volts are defined as impermissibly high voltage. This definition, however, depends entirely upon the permissible limit values of the opto-coupler V2, so that with a corresponding differently selected opto-coupler the Zener diode ZD2 must also be correspondingly differently dimensioned.

In the transmission branch of the coupling unit 3, the Zener diode ZD3 first recognizes that an impermissibly high voltage is present, as a result of which the diode becomes conductive so that a voltage drops across the resistance R6 which voltage is supplied via the resistance R2 to the base of the transistor T2. This becomes conductive and short-circuits the base-emitter voltage of the transistor T1 so that this is switched off and goes into a non-conductive state. In this way, impermissibly high voltages are kept away from the transistor T4 and the receiving transistor of the opto-coupler V1 in the transmission branch of the coupling unit 3. Since the above-described switching off of the transmission branch does not occur sufficiently rapidly in some cases, the Zener diode ZD4 is additionally provided for the momentary appearance of an overvoltage.

When employing Zener diodes for overvoltage protection it is to be taken into account that when diverting an overvoltage the Zener diode must at the same time carry a high current, as a result of which a large quantity of electrical energy is transformed into heat energy in the Zener diode. This can easily result in damage to the Zener diode which then, in the case of a melt-through, would open the connection which would lead to a loss of the overvoltage protection. For this reason, the PTC resistor RK is provided in the receiving branch of the coupling unit 3, which resistor initially has a very low resistance but with a persistent large current flow increases its resistance in correspondence with its heating. In this way, in the case of a persistent application of an overvoltage, this is taken over by the PTC resistor RK and the current flow through the Zener diode ZD2 is restricted. Analogous protection of the Zener diode ZD4 is not necessary since at the latest when the circuit arrangement with the transistors T1 and T2 is switched off no further overvoltage need be diverted by the Zener diode ZD4. Further, it should be noted that for the transmission branch of the coupling unit 3 an overvoltage protection provided only by a Zener diode with a PTC resistor does not function satisfactorily. The PTC resistor would too strongly influence the data transfer in the case of the transfer of signals to the data bus since for the functioning of the transmission branch, which is determined by the resistance modulation by means of the transistor T4, a flow of heavier currents is provided. In a case in which the resistance of the transistor T4 is varied with, for example, square-wave curve form, a PTC resistor in the transmission branch of the coupling unit would lead to a rounding of this curve form. Such rounding could then, in the monitoring of the loading of the d.c. voltage source DC at the resistance R1 in the central control unit 5, result in the reception in the central unit 5 being disrupted.

As indicated by broken lines in FIG. 2, any desired number of similar electronic apparatuses can be connected to the data line 1, via respective coupling units 3. There thus results an arrangement as represented in FIG. 1. Particularly in the case of employment of a multiplicity of such electronic ballasts is the advantage of the described circuitry arrangement apparent. Without the switching off of the transmission diode of the opto-coupler V2, the d.c. voltage generator DC would be constantly loaded by a d.c. signal which, in the case of employment of many ballasts, would lead to a requirement for an unnecessarily large dimensioning with regard to the load carrying ability of the d.c. voltage generator DC in the central unit 5. In contrast, in the above-described circuitry arrangement in the receiving operation of the central unit 5 a loading of d.c. voltage generator occurs only in the case of a return report from one of the electronic ballasts. Thus, the outlay for d.c. source DC in the central unit 5 can be minimized, which reduces the manufacturing cost of such an arrangement by a considerable extent.

We claim:

1. Circuitry arrangement for controlling a plurality of consumers having a central control unit to which each consumer is connected via a coupling unit associated with the consumer and via a data bus, the coupling unit having a receiving branch for passing control information from the central control unit to the consumer associated with the coupling unit and a transmission branch for passing return report information from the consumer to the central control unit, characterized in that, each coupling unit has a switching device which places the receiving branch of the coupling unit into an inactive state in the case of non-sending operation of the control unit, so that the receiving branch consumes no more than a very small quiescent current, the transmission branch of the coupling unit being continuously active.

2. Circuitry arrangement according to claim 1, characterized by, an overvoltage protection circuit for at least one of the receiving branch and the transmission branch.

3. Circuitry arrangement according to claim 1, characterized in that, there is arranged in series with the transmission branch a switch controlled by an overvoltage detector, which switch opens in the case of overvoltage and decouples the transmission branch from a bus.

4. Circuitry arrangement according to claim 3, characterized in that, there is provided between the switch and the transmission branch a quick-acting supplementary protection switch which diverts a momentary overvoltage, the quick-acting protection switch being a Zener diode connected in parallel with the transmission branch, the Zener voltage of which Zener diode is below a voltage permissible for the transmission branch.

5. Circuitry arrangement according to claim 3 or 4, characterized in that, the overvoltage detector has a Zener diode which switches the switch to be conductive in the case of a voltage permissible for the transmission branch, and upon detection of an overvoltage activates a first transistor which switches the switch to be non-conductive.

6. Circuitry arrangement according to any of claims 3 to 5, characterized in that, the switch arranged in series with the transmission branch is a second transistor.

7. Circuitry arrangement according to any preceding claim, characterized in that, there is connected in parallel to the receiving branch a Zener diode equipped with overload protection means, which Zener diode diverts overvoltages appearing at the receiving branch, the overload protection means being a PTC resistor which is connected in series before a parallel connection of receiving branch and Zener diode.

8. Circuitry arrangement according to any preceding claim, characterized in that, the central control unit is switched either to a sending operation condition or to a receiving operation condition and has an output device which applies to the bus at least one of a signal indicating the sending operation condition of the control unit and a signal indicating the non-sending operation condition of the control unit.

9. Circuitry arrangement according to any preceding claim, characterized in that, each coupling unit has both in the receiving branch and in the transmission branch respective transfer devices which separate the bus from the consumer electrically, each transfer device being formed with an opto-coupler.

10. Circuitry arrangement according to any preceding claim, characterized in that, the switching device places the receiving branch of the coupling unit into the inactive state when the central control unit sends out no signal over the data bus indicating the sending operation condition.

11. Circuitry arrangement according to any preceding claim, characterized in that, the switching device has a switch the switching condition of which depends upon the voltage level of signals coming from the data bus.

12. Circuitry arrangement according to claim 11, characterized in that, the switch is formed by means of a Zener diode.

13. Circuitry arrangement according to any preceding claim, characterized in that, a current limiting circuit is provided in the coupling unit, which circuit determines the maximum current take up of the coupling unit, the current limiting circuit being formed by means of a constant current source comprising a MOS field effect transistor.

14. Circuitry arrangement according to any preceding claim, characterized in that, the coupling unit has polarity reversal protection means for connection to the data bus, which means are formed with a rectifier bridge circuit.

15. Circuitry arrangement according to claim 5, characterized in that, the switch arranged in series with the transmission branch is a second transistor (T1).

* * * * *